United States Patent [19]

Wokke et al.

[11] Patent Number: 4,957,199
[45] Date of Patent: Sep. 18, 1990

[54] CONVEYOR BELT

[76] Inventors: Eduard A. Wokke, Fluessen 7, 9204 HR Drachten; Hans De Vries, Dollard 292, 9204 CZ Drachten, Netherlands

[21] Appl. No.: 338,563

[22] Filed: Apr. 14, 1989

Related U.S. Application Data

[63] Continuation of Ser. No. 121,876, Nov. 17, 1987, abandoned.

[30] Foreign Application Priority Data

Nov. 21, 1986 [NL] Netherlands ............ 8602967

[51] Int. Cl.$^5$ ............................................. B65G 15/34
[52] U.S. Cl. ................................. 198/847; 198/844.1
[58] Field of Search ................................ 198/847, 844

[56] References Cited

U.S. PATENT DOCUMENTS

| Re. 26,731 | 12/1962 | Robinson | 198/847 X |
|---|---|---|---|
| 1,405,158 | 1/1922 | Petersen | 198/847 |
| 3,144,930 | 8/1964 | Michels | 198/847 |
| 3,944,060 | 3/1976 | Hartmann | 198/847 |
| 4,004,467 | 1/1977 | Kenney | |
| 4,094,402 | 6/1978 | Heeke | 198/847 |
| 4,184,589 | 1/1980 | Habegger | 198/847 |
| 4,243,714 | 1/1981 | Vanassche et al. | 198/847 X |
| 4,411,947 | 10/1983 | Heynhold | 198/847 X |
| 4,449,627 | 5/1984 | Kell | 198/847 |
| 4,650,068 | 3/1987 | Vanassche et al. | 198/847 |

FOREIGN PATENT DOCUMENTS

| 1270487 | 6/1968 | Fed. Rep. of Germany . | |
| 1439979 | 4/1966 | France . | |
| 991182 | 5/1965 | United Kingdom | 198/847 |

Primary Examiner—Robert J. Spar
Assistant Examiner—D. Glenn Dayoan

[57] ABSTRACT

Conveyor belt having a carrier body in which are disposed at least three layers, of which two are rigid in respect of deflection in transverse direction and one layer provides longitudinal strength. One of the layers imparting transverse rigidity is combined with the layer imparting longitudinal strength to form one layer consisting of longitudinal and transverse wires. At least the transverse wires are made of high modulus material.

1 Claim, 1 Drawing Sheet

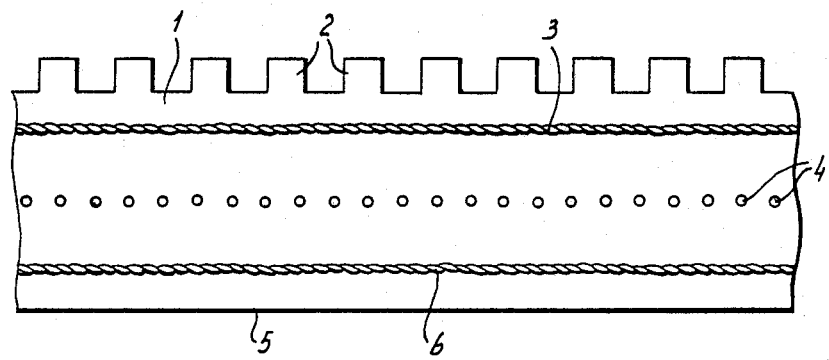
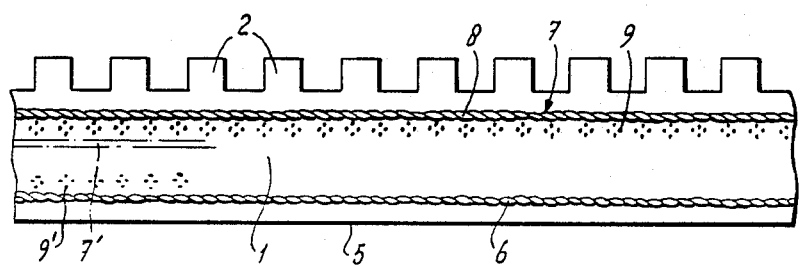
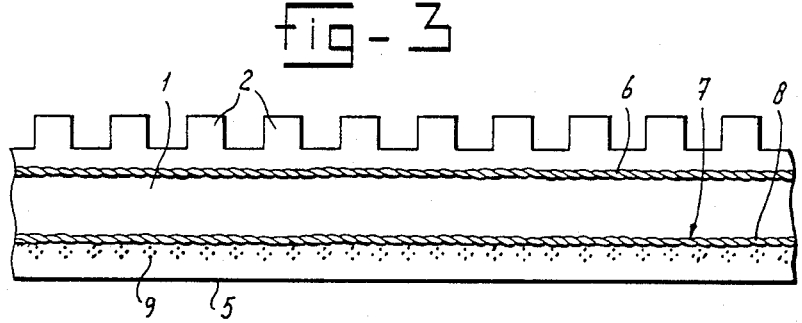

CONVEYOR BELT

This application is a continuation of application Ser. No. 121,876, filed 11/17/87 now abandoned.

The present invention relates to a conveyor belt comprising a carrier body in which are disposed two layers which are rigid in respect of deflection in the transverse direction, as well as at least one other layer providing longitudinal strength.

A conveyor belt of this kind is generally known and is used, among other purposes, for transporting people. In practice it has not been found desirable to support the belt by means of rollers over its full width because as the belt moves over the rollers the persons carried on it have a floating feeling which may be found disagreeable. Conveyor belts of this kind are therefore supported by rollers only at their edges, and provision must be made to ensure that the deflection in the middle amounts to less than 1% when loaded by a person weighing 65 kilograms. In the direction from the carrier surface to the back of the belt, known belts comprise in succession a layer of wires, generally steel wires, which provide rigidity against deflection in the transverse direction, followed by one or more layers intended to provide strength in the longitudinal direction, and finally a series of transverse steel wires. The longitudinal wires consist of polyester filaments or other synthetic or natural fibres.

This known conveyor belt has the disadvantage that in order to achieve the required rigidity it must be made rather heavy, that is to say thick.

The aim of the invention is to provide a transversely rigid conveyor belt which can be made lighter and therefore less expensive while retaining the same rigidity, or which has greater rigidity with the same thickness. According to the invention this aim is achieved in that one of the layers imparting transverse rigidity is combined with the layer imparting longitudinal strength to form one layer consisting of longitudinal wires and transverse wires, while at least the transverse wires are made of high-modulus material.

Since the layer imparting transverse rigidity is now combined with the layer imparting longitudinal strength and consists of longitudinal wires and transverse wires, while at least the transverse wires are made of high-modulus material, on the one hand it is possible to dispense with the usual layer of wires extending in the longitudinal direction between the two layers extending in the transverse direction, while on the other hand the constructional thickness of the belt can be considerably reduced while the same transverse rigidity is retained.

Not only does this result in a thinner belt which can be produced at lower cost, but also has the consequence that the diameters of the drums around which conveyor belts of this kind run can thus be made smaller. This in turn means that the space between the roof and floor of two storeys, which in the case of airports and the like is now determined by the diameter of the drums, can be considerably reduced, with all the consequent advantages.

In one advantageous embodiment at least the transverse wires are made of steel material. Apart from the fact that steel is an inexpensive high-modulus material, the advantage is also gained that the removal of rubber material for the purpose of connecting ends to make an endless belt is considerably simplified. In the case of the layer extending in the longitudinal direction according to the prior art, which consists of textile fibres, there was a danger that cutting into the rubber material would damage the textile fibres. Through the use of steel wire this risk of damage is greatly reduced. Protection of the longitudinal wires against damage on removal of the rubber can be achieved because the transverse wires are situated closer to the carrier surface. In addition, in order to increase rigidity, transverse wires can be disposed on both sides of the longitudinal wires.

In addition, the bundle of steel wires extending the transverse direction, which in the prior art is disposed near the inner side of the belt, that is to say the opposite side to the carrier surface of the conveyor belt, can be replaced by a layer providing transverse rigidity combined with wires providing longitudinal strength as described above, whereby a particularly rigid construction is obtained.

Furthermore, the longitudinal wires and transverse wires can form a woven fabric in which the longitudinal wires are the warp and the transverse wires the weft.

The invention will be described in greater detail below with reference to the examples of embodiment illustrated in the accompanying drawings, in which:

FIG. 1 is a cross-section through a conveyor belt according to the prior art,

FIG. 2 is a cross-section through a conveyor belt according to the invention, and FIG. 3 is a cross-section through another form of construction of the transversely rigid belt.

The belt shown in FIG. 1 consists of a carrier body 1 of rubber material, which on its upper face is provided with a ribbed surface 2 intended for carrying objects to be conveyed, such as people. In the carrier body 1 a layer of steel wires 3 extending in the transverse direction is disposed near the ribbed carrier surface 2. Approximately in the middle is disposed a woven fabric 4 of textile fibres, consisting of polyester warp threads or other synthetic fibre material. In addition, a layer of steel wires 6 extending in the transverse direction is disposed near the inner side 5, that is to say the opposite side to the ribbed carrier surface 2. For the purpose of joining together the ends of the belt, steel wires 3 must be removed and the rubber material cut through as far as the fabric 4. This entails the risk that the fabric will be damaged.

FIG. 2 shows the conveyor belt according to the present invention, corresponding parts being given the same reference numerals. From this figure it can be seen that the layer 7 providing rigidity against deflection is once again situated close to the ribbed carrier surface 2. In the embodiment illustrated in FIG. 2 this layer consists of transverse wires 8 and longitudinal wires 9. In another embodiment a layer of transverse wires may also be disposed on the other side of the longitudinal wires, as indicated by the broken line 7', whereby rigidity is further increased. The steel wires designated 6 in the bottom part may also be combined with a layer imparting longitudinal strength, as indicated by 9'. FIG. 2 teaches that with the same transverse rigidity the belt can be made thinner than the belt shown in FIG. 1, so that a saving in costs can be achieved. In this connection 20% of the cost of the entire installation will usually be due to the conveyor belt. In addition, smaller and therefore less expensive return drums can be used, and the structure using this conveyor belt can be made smaller, simpler and less expensive. The material used for the weft wires 8 is a high-modulus material, such as for example steel. When use is made of a fabric consisting of weft wires 8 and warp wires 9, it is possible for example to utilize the product known as FLEXIMAT®, which is marketed by the Bekeart Company.

Finally, FIG. 3 shows a variant of the transversely rigid conveyor belt according to the invention, in which the layer 7 is provided only on the side 5, that is to say the side remote from the carrier surface, and the layer 6 lies close to the carrier surface 2.

Instead of steel, an aromatic polyamide (aramide) can be used. Steel material may also be used for the longitudinal or warp wires 9. For the purpose of making the belt into an endless belt, it is now only necessary to remove rubber material from the ribbed carrier surface as far as the transverse wires 8. If the latter are made of steel, the risk of damage is practically eliminated with the techniques now customary for the removal of rubber material.

I claim:

1. A conveyor belt having a ribbed upper carrying surface and an opposite lower surface and having two layers which are rigid in respect of deflection in the transverse direction as well as only one other layer providing longitudinal strength, said layers imparting transverse rigidity being spaced apart and disposed respectively adjacent said upper and lower surfaces, the lower of said layers imparting transverse rigidity being combined with said only one layer imparting longitudinal strength to form one layer consisting of longitudinal and transverse wires, at least said transverse wires being made of high modulus material.

* * * * *